(12) United States Patent
Nelliappan

(10) Patent No.: US 11,118,046 B2
(45) Date of Patent: *Sep. 14, 2021

(54) COMPOSITE POLYMER COMPOSITION

(71) Applicant: Rohm and Haas Company, Philadelphia, PA (US)

(72) Inventor: Veera Nelliappan, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/426,077

(22) Filed: Feb. 7, 2017

(65) Prior Publication Data
US 2017/0145204 A1     May 25, 2017

Related U.S. Application Data

(62) Division of application No. 14/902,579, filed as application No. PCT/US2014/044799 on Jun. 30, 2014, now Pat. No. 9,598,569.

(60) Provisional application No. 61/841,675, filed on Jul. 1, 2013.

(51) Int. Cl.
| | | |
|---|---|---|
| *C08L 23/26* | (2006.01) | |
| *C08L 51/06* | (2006.01) | |
| *C08F 255/02* | (2006.01) | |
| *C08L 69/00* | (2006.01) | |
| *C08F 285/00* | (2006.01) | |

(52) U.S. Cl.
CPC ............ *C08L 51/06* (2013.01); *C08F 255/02* (2013.01); *C08F 285/00* (2013.01); *C08L 23/26* (2013.01); *C08L 69/00* (2013.01); *C08L 2205/02* (2013.01); *C08L 2205/03* (2013.01); *C08L 2207/53* (2013.01)

(58) Field of Classification Search
CPC .... C08F 255/02; C08F 255/08; C08F 220/06; C08F 220/10; C08F 222/06
See application file for complete search history.

(56) References Cited

FOREIGN PATENT DOCUMENTS

| JP | 2000264933 | 9/2000 |
| JP | 2012188495 | 10/2012 |
| WO | WO2005/021622 | 3/2005 |

OTHER PUBLICATIONS

Machine translation of JP2000264933. (Year: 2000).*
Machine translation of JP2012188495. (Year: 2012).*
Japanese Office Action dated Mar. 30, 2018; from Japanese counterpart Application No. 2016-524281.
Japanese Office Action dated Sep. 13, 2018; from counterpart Japanese Application No. 2016-524281.
Chinese Divisoinal Office Action dated Sep. 26, 2019; from counterpart Chinese Divisonal Application No. 201810007652.6.
Chinese Office Action dated May 27, 2020; from counterpart Chinese Application No. 201810007652.6.

* cited by examiner

*Primary Examiner* — Wenwen Cai

(57) ABSTRACT

A composite polymer composition comprising the emulsion polymerization product of: (i) an aqueous dispersion comprising the melt kneading product of one or more polyolefins, from 2 to 25 wt % of one or more dispersion stabilizing agents, water and optionally a neutralizing agent, and (ii) one or more (meth)acrylic monomers; wherein the one or more polyolefins have a Tg equal to or less than 50° C. and comprise from 0.5 to 100 wt % functionalized polyolefin; and wherein the melt kneading product (i) comprises polymer particles having a volume average particle size between 150 nm and 2000 nm dispersed in the water; and wherein the one or more (meth)acrylic monomers polymerize onto the polymer particles form composite polymer particles using an emulsion polymerization process is provided.

4 Claims, No Drawings

COMPOSITE POLYMER COMPOSITION

This application is a divisional of U.S. application Ser. No. 14/902,579, filed on Jan. 3, 2016; which claims priority to PCT/US2014/044799, filed Jun. 30, 2014, which claims priority to U.S. Provisional Application No. 61/841,675, filed on Jul. 1, 2013, the disclosures of which are incorporated herein by reference.

FIELD OF INVENTION

The instant invention relates to a composite polymer composition.

BACKGROUND OF THE INVENTION

Polymeric additives are used in a variety of resin modification applications. For example, polybutadiene/poly(methyl methacrylate) core/shell based polymers are used to improve the impact properties of thermoplastic resins, such as polycarbonates. Butadiene/(meth)acrylate based polymeric additives, however, frequently display poor weatherability and end up discolored. Polyolefin particles (composite) have also been used to improve the impact resistance of resins, such as polycarbonate while not affecting the weatherability of the thermoplastic matrix.

Furthermore, polyolefin dispersions are also known to be used in a variety of applications. However, such dispersion likewise may be improved in one or more properties by functionalization. Functionalizing these composite polymer particles would enable one to tailor properties to several applications and improve performance in existing applications. Such functionalized composite polymer composition may be useful in can coatings, coatings, cellulose coatings, binders and non-woven textiles, textile coatings, inks and pigments, films, absorbents, ion exchange, carpet backing or adhesive, and fiber adhesive. Therefore, improvements in composite polymer particles continue to present opportunities.

SUMMARY OF THE INVENTION

The instant invention is a composite polymer composition.

In one embodiment, the instant invention provides a composite polymer composition comprising: the emulsion polymerization product of: (i) an aqueous polyolefin dispersion comprising the melt kneading product of one or more polyolefins, from 2 to 25 wt % of one or more dispersion stabilizing agents, water and optionally a neutralizing agent, and (ii) one or more (meth)acrylic monomers; wherein the one or more polyolefins have a Tg equal to or less than 50° C. and comprise from 0.5 to 100 wt % functionalized polyolefin; and wherein the melt kneading product (i) comprises polymer particles having a volume average particle size from 150 nm to 2000 nm dispersed in the water; and wherein the one or more (meth)acrylic monomers polymerize onto the polymer particles to form composite polymer particles.

DETAILED DESCRIPTION OF THE INVENTION

The instant invention is a composite polymer composition.

The composite polymer composition according to the present invention comprises: the emulsion polymerization product of: (i) an aqueous polyolefin dispersion comprising the melt kneading product of one or more polyolefins, less than or equal to 8 wt % of one or more dispersion stabilizing agents and water, and (ii) one or more (meth)acrylic monomers; wherein the one or more polyolefins have a Tg equal to or less than 50° C. and comprise from 0.5 to 100 wt % functionalized polyolefin; and wherein the melt kneading product (i) comprises polymer particles having a volume average particle size from 150 nm to 2000 nm dispersed in the water; and wherein the one or more (meth)acrylic monomers polymerize onto the polymer particles to form composite polymer particles.

Aqueous Polyolefin Dispersion
Polyolefin

The aqueous dispersion comprises from 5 to 99 percent by weight of one or more polyolefins, based on the total weight of the solid content of the aqueous dispersion. All individual values and subranges from 5 to 99 weight percent are included herein and disclosed herein; for example, the weight percent can be from a lower limit of 5, 8, 10, 15, 20, 25 weight percent to an upper limit of 40, 50, 60, 70, 80, 90, 95, or 99 weight percent. For example, the aqueous dispersion may comprise from 15 to 99, or from 15 to 90, or 15 to 80, or from 15 to 75, or from 30 to 70, or from 35 to 65 percent by weight of one or more polyolefins, based on the total weight of the solid content of the aqueous dispersion. The aqueous dispersion comprises at least one or more polyolefins.

The polyolefins used in the invention have Tg less than or equal to 50° C. All individual values and subranges equal to or less than 50° C. are disclosed herein and included herein. For example, the Tg may be equal to or less than 50° C., or in the alternative, the Tg may be equal to or less than (other than 50?) 40° C., or in the alternative, the Tg may be equal to or less than 30° C., or in the alternative, the Tg may be equal to or less than 15° C., or in the alternative, the Tg may be equal to or less than 0° C., or in the alternative, the Tg may be equal to or less than −15° C. In one embodiment, the polyolefins have a Tg equal to or less than −50° C.

Examples of polyolefins include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer. These resins may be used either alone or in combinations of two or more.

In selected embodiments, base polymer may, for example, comprise one or more polyolefins selected from the group consisting of ethylene-alpha olefin copolymers, propylene-alpha olefin copolymers, and olefin block copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the base polymer may, for example, be ethylene vinyl acetate (EVA) based polymers. In other embodiments, the base polymer may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In one particular embodiment, the polyolefin is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The olefin copolymer may have a melt flow rate in the range of from 1 to 1500 g/10 minutes, measured in accordance with ASTM D-1238 (at 190° C./2.16 Kg). All individual values and subranges from 1 to 1500 g/10 minutes are included herein and disclosed herein; for example, the melt flow rate can be from a lower limit of 1 g/10 minutes, 2 g/10 minutes, 3 g/10 minutes, 4 g/10 minutes, 5 g/10 minutes 100 g/10 minutes, 200 g/10 minutes, 500 g/10 minutes, 800 g/10 minutes, 1000 g/10 minutes, 1300 g/10 minutes; or 1400 g/10 minutes to an upper limit of 1500 g/10 minutes, 1250 g/10 minutes, 1000 g/10 minutes, 800 g/10 minutes, 500 g/10 minutes, 100 g/10 minutes, 50 g/10 minutes, 40 g/10 minutes, and 30 g/10 minutes. For example, the propylene/alpha-olefin copolymer may have a melt flow rate in the range of from 1 to 1500 g/10 minutes; or from 1 to 500 g/10 minutes; or from 500 to 1500 g/10 minutes; or from 500 to 1250 g/10 minutes; or from 300 to 1300 g/10 minutes; or from 5 to 30 g/10 minutes.

The olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such olefin copolymers are commercially available from The Dow Chemical Company, under the tradename VERSIFY™ and ENGAGE™, or from ExxonMobil Chemical Company, under the tradename VISTAMAXX™ and EXACT™.

In certain other embodiments, the polyolefin may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, may be used as the polyolefin. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

Re>1481-1629(d); or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the polyolefin may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR, commercially available from The Dow Chemical Company, NUCREL, commercially available from E.I. DuPont de Nemours, and ESCOR, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the polar polyolefin may be selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided, however, that base polymer may, for example, have a lower acid number, measured according to ASTM D-974, than the stabilizing agent.

In certain embodiments, the polyolefin may contain from 0.5 to 100 wt % modified, or functionalized, polyolefin. All values and subranges from 0.5 to 100 wt % are included herein and disclosed herein; for example, the amount of modified polyolefin may range from a lower limit of 0.5, 1, 15, 25, 35, 45, 55, 65, 75, 85 or 95 wt % of the total polyolefin to an upper limit of 1, 5, 10, 20, 30, 40, 50 60, 70, 80, 90 or 100 wt % of the total polyolefin.

In various embodiments, the functionalization of the polyolefin may be performed in the melt, in solution, in the extruder when the polyolefin is dispersed in the fluid medium, in the solid-state, in a swollen-state, and the like. It will be understood that the functionalization will result in some level of crosslinking.

The olefin polymers and/or the composite polymer particles may be modified by typical grafting, hydrogenation, nitrene insertion reactions, or other functionalization reactions, well known to those skilled in the art. Preferred functionalizations are grafting reactions using a free radical mechanism. As used herein, the term "functionalized polyolefin" means an olefin polymer or the polyolefin component of a composite polymer particle which has been modified or functionalized according to any of these functionalization reactions.

A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon. Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxymethyltrimethoxysilane, methacryloxymethyltriethoxysilane; acrylonitrile; 2-isopropenyl-2-oxazoline; styrene; .alpha.-methyl styrene; vinyltoluene; dichlorostyrene; N-vinylpyrrolidinone, vinyl acetate, methacryloxypropyltrialkoxysilanes, methacryloxymethyltrialkoxysilanes and vinyl chloride.

A thermal grafting process is one method for reaction, however, other grafting processes may be used, such as photo initiation, including different forms of radiation, e-beam, or redox radical generation.

Functionalization may occur via a free radical mechanism, with the aid of peroxides for example, but may also occur at the terminal unsaturated group (e.g., vinyl group) or an internal unsaturation group, when such groups are present in the polymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether, silane, siloxane, and so on, or functional unsaturated compounds, such as maleic anhydride, can be added across a terminal or internal unsaturation via known chemistry. Other functionalization methods include those disclosed in the following U.S. Pat. No. 5,849,828, entitled, "Metalation and Functionalization of Polymers and Copolymers;" U.S. Pat. No. 5,814,708, entitled, "Process for Oxidative Functionalization of Polymers Containing Alkylstyrene;" and U.S. Pat. No. 5,717,039, entitled, "Functionalization of Polymers Based on Koch Chemistry and Derivatives Thereof" Each of these patents is incorporated by reference, herein, in its entirety.

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides.

The maleic anhydride, as well as many other unsaturated heteroatom containing species, may be grafted to the polymer by any conventional method, typically in the presence of a free radical initiator, for example the peroxide and azo classes of compounds, etc., or by ionizing radiation. Organic initiators are preferred, such as any one of the peroxide initiators, such as, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. A suitable azo compound is 2,2'-azobis (isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated polymer. For example, the degree of maleic anhydride/succinic anhydride, their oligomers, and their derivatives, including hydrolysis products, grafted onto the grafted polymer may be influenced by the aforementioned considerations. Additionally, the degree and type of branching, and the amount of crosslinking, may also be influenced by the reaction conditions and concentrations. The composition of the base olefin interpolymer may also play a role in the final structure of the maleated polymer. The resulting structure, will in turn, affect the properties and use of the final product. Typically, the amount of initiator and maleic anhydride employed will not exceed that, which is determined to provide the desired level of maleation and desired melt flow, each required for the functionalized polymer and its subsequent use.

The grafting reaction should be performed under conditions that maximize grafts onto the polymer backbone, and minimize side reactions, such as the homopolymerization of the grafting agent, which is not grafted to the olefin interpolymer. It is not unusual that some fraction of the maleic anhydride (and/or its derivatives) does not graft onto the olefin interpolymer, and it is generally desired that the unreacted grafting agent be minimized. The grafting reactants such as peroxide and maleic acid may be added to the polyolefin dispersion, and the grafting reaction may be performed in the melt, in solution, in the extruder when it is in a dispersion state, in the solid-state, in a swollen-state, and the like. The maleation may be performed in a wide-variety of equipments, such as, but not limited to, twin screw extruders, single screw extruders, Brabenders, batch reactors, and the like.

Preferred maleic anhydride grafted polymers include the AMPLIFY polymers (available from The Dow Chemical Company.) Additional examples include FUSABOND (available from E.I. DuPont de Nemours), EXXELOR (available from ExxonMobil Chemical Company), and POLYBOND (available from Chemtura Corporation), and LICOCENE (available from Clariant International Ltd.).

In one embodiment, the maleic anhydride grafted polymer comprises from 0.3 weight percent to 10.0 weight percent grafted maleic anhydride, based on the total weight of the grafted polymer. In a further embodiment, the maleic anhydride grafted polymer is a maleic anhydride grafted ethylene-based polymer. In a further embodiment, the maleic anhydride grafted polymer is a maleic anhydride grafted ethylene/α-olefin interpolymer.

Additional embodiments of the invention provide for olefin interpolymers grafted with other carbonyl-containing compounds. In one embodiment, these grafted olefin interpolymers may have molecular weight distributions and/or densities the same as, or similar to, those described above for the grafted maleic anhydride olefin interpolymers. In another embodiment, these grafted olefin interpolymers are prepared using the same or similar amounts of grafting compound and initiator as those used for the grafted maleic anhydride olefin interpolymers, as described above. In another embodiment, these grafted olefin interpolymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

Additional embodiments of the invention provide for olefin interpolymers grafted with other carbonyl-containing compounds. In one embodiment, these grafted olefin interpolymers may have molecular weight distributions and/or densities the same as, or similar to, those described above for the grafted maleic anhydride olefin interpolymers. In another embodiment, these grafted olefin interpolymers are prepared using the same or similar amounts of grafting compound and initiator as those used for the grafted maleic anhydride olefin interpolymers, as described above. In another embodiment, these grafted olefin interpolymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

In one embodiment, the invention provides olefin interpolymers grafted with at least one silane compound. The grafted silane olefin interpolymer may or may not contain small amounts of hydrolysis product and/or other derivatives.

Those having ordinary skill in the art will recognize that the above list is a non-comprehensive listing of exemplary polyolefins. It will be appreciated that the scope of the present invention is restricted by the claims only.

Crosslinker

The functionalized polyolefins disclosed herein may also be modified by various chain extending or cross-linking processes, including, but not limited to peroxide-, silane-, sulfur-, radiation-, or azide-based cure systems. A full description of the various cross-linking technologies is described in U.S. Pat. Nos. 5,869,591 and 5,977,271, both of which are herein incorporated by reference in their entirety. In various embodiments, the crosslinking of the polyolefin may be performed in the melt, in solution, in the extruder when the polyolefin is dispersed in the fluid medium, in the solid-state, in a swollen-state, and the like. It would be understood that the polyolefin may be crosslinked with or without functionalization of the polyolefin.

Stabilizing Agent

The aqueous dispersion further comprises at least one or more stabilizing agents, also referred to herein as dispersion agents, to promote the formation of a stable dispersion. The stabilizing agent may preferably be an external stabilizing agent. The aqueous dispersion comprises 2 to 25 percent by weight of one or more stabilizing agents, based on the total weight of the solid content of the dispersion. All individual values and subranges from 2 to 25 weight percent are included herein and disclosed herein; for example, the weight percent can be from a lower limit of 2, 5, 7, 9, 11, 14, 19 or 24 weight percent to an upper limit of 4, 6, 8 10, 15, 20 or 25 weight percent. For example, the dispersion may comprise from 2 to 25, or in the alternative from 1 to 5, or in the alternative from 3 to 10, or in the alternative from 2 to 8 percent, or in the alternative from 5 to 20 percent, or in the alternative from 10 to 20 percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR, commercially available from The Dow Chemical Company, NUCREL, commercially available from E.I. DuPont de Nemours, and ESCOR, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may optionally be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the polyolefin during dispersion preparation. Examples of external surfactants useful herein include, but are not limited to, salts of dodecyl benzene sulfonic acid and lauryl sulfonic acid salt. Internal surfactants are surfactants that do become chemically reacted into the polyolefin during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

Fluid Medium

The dispersion further comprises a fluid medium. The fluid medium may be any medium; for example, the fluid medium may be water. The dispersion of the instant invention comprises 35 to 80 percent by volume of fluid medium, based on the total volume of the dispersion. In particular embodiments, the water content may be in the range of from 35 to 75, or in the alternative from 35 to 70, or in the alternative from 45 to 60 percent by volume, based on the total volume of the dispersion. Water content of the dispersion may preferably be controlled so that the solids content (polyolefin plus stabilizing agent) is between about 1 percent to about 74 percent by volume. In particular embodiments, the solids range may be between about 10 percent to about 70 percent by volume. In other particular embodiments, the solids range is between about 20 percent to about 65 percent by volume. In certain other embodiments, the solids range is between about 25 percent to about 55 percent by volume.

Additional Components

In some embodiments, the aqueous dispersion may further comprise optionally one or more binder compositions such as acrylic latex, vinyl acrylic latex, styrene acrylic latex, vinyl acetate ethylene latex, and combinations thereof; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more co-solvents, e.g. glycols, glycol ether, 2,2,4-trimethyl-1,3-pentanediol monoisobutyrate, alcohols, mineral spirits, and benzoate esters; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates.

Forming the Aqueous Dispersion

The aqueous dispersion can be formed by any number of methods recognized by those having skill in the art. In one embodiment, one or more polyolefin, one or more subparticles, and optionally one or more stabilizing agents are melt-kneaded in an extruder along with water and a neutralizing agent, such as ammonia, potassium hydroxide, or a combination of the two to form a dispersion. In another embodiment, one or more polyolefins and one or more subparticles are compounded, and then the polyolefin/subparticles compound is melt-kneaded in an extruder in the presence of an optional stabilizing agent, water, and one or more neutralizing agents thereby forming a dispersion. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more polyolefins, in the form of pellets, powder, or flakes, are fed from the feeder to an inlet of the extruder where the resin is melted or compounded. One or more subparticles may be fed simultaneously with one or more polyolefins into the extruder via the feeder; or in the alternative, one or more subparticles may be compounded into one or more polyolefins, and then fed into the extruder via the feeder. In the alternative, additional one or more subparticles may further be metered via an inlet prior to the emulsification zone into the molten compound comprising one or more polyolefins and optionally one or more subparticles. In some embodiments, the dispersing agent is added to one or more polyolefins through and along with the resin and in other embodiments, the dispersing agent is provided separately to the twin screw extruder. The resin melt is then delivered from the mix and convey zone to an emulsification zone of the extruder where the initial amount of water and base from the water and base reservoirs are added through an inlet. In some embodiments, dispersing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone.

In other embodiments, crosslinking agents such as peroxides along with functionalizing additives such as maleic acid could be injected along with the dilution water, such that at the high temperature in the extruder or melt blender/kneader these could crosslink and/or functionalize the functional group. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In yet other embodiments, the polyolefin dispersion is heated with maleic acid and organic peroxides in a pressurized reactor at high temperatures (>120° C.) such that the peroxides crosslink the polyolefins and also graft the maleic acid to the polyolefin. An acrylic shell can be further added to these functionalized particles to form a core/shell type composite particles.

The melt kneading product comprises of functionalized and/or crosslinked polymer particles having a volume average particle size from 150 nm to 2000 nm dispersed in the water. All values and subranges from 150 nm to 2000 nm are included herein and disclosed herein; for example the particle size may range from a lower limit of 150, 350, 550, 750, 950, 1150, 1350, 1550, 1750 or 1950 nm to an upper limit of 200, 400, 600, 800, 1000, 1200, 1400, 1600, 1800 or 2000 nm.

(Meth)Acrylic Monomers

As used herein, the term "(meth)acrylic" means acrylic or methacrylic.

(Meth)acrylic monomers used herein include, by way of example, C1-C18 (meth)acrylates, such as, butyl acrylate, ethylacrylate, 2-ethyl hexyl acrylate, propyl acrylate, methyl acrylate, hexyl acrylate, butylmethacrylate, methylmethacrylate, ethylhexyl methacrylate, stearyl acrylate, benzyl acrylate, cyclohexyl methacrylate, isobornyl methacrylate, tetrahydrofurfuryl methacrylate, cyclopentyl methacrylate, trifluoroethylmethacrylate, hydroxyethylmethacrylate and dicyclopentadienyl methacrylate and blends thereof, and combinations thereof.

The (meth)acrylic monomers may be functionalized, non-functionalized or a combination thereof.

Exemplary functionalized (meth)acrylic monomers include but not limited to, acrylic acid, methacrylic acid, glycidyl methacrylate, allyl methacrylate, hydroxyethyl methacrylate, and acrylamide.

Emulsion Polymerization

Emulsion polymerization conditions are well known in the art. Emulsion polymerization processes typically utilize one or more surfactants. Optionally, exemplary surfactant includes, for example, sodium dodecyl benzene sulfonate surfactant.

One or more crosslinking and/or graft-linking agents may optionally be added to the emulsion polymerization. Exemplary crosslinking agents include, for example, divinylbenzene; vinyl group-containing monomers including; triallyl (iso)cyanurate, and triallyl trimelitate; (poly)alkylene glycol di(meth)acrylate compounds including ethylene glycol dimethacrylate (EGDMA), diethylene glycol dimethacrylate, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate and mixtures and combination thereof.

Exemplary graft-linking agents include, for example, allyl methacrylate, diallyl maleate and allyl acryloxypropionate.

In an alternative embodiment, the composite polymer particles of the instant invention may be used as an additive in a matrix polymer resin. Such matrix polymer resin may include, for example, polycarbonate (PC) and PC blends, polyesters (such as, polybutylene terephthalate/polyethylene terephthalate (PBT/PET) and polylactic acid), polystyrene (PS), styrenic copolymers (such as, acrylonitrile butadiene styrene (ABS)), polyvinylchloride (PVC), polyamides (PA) (such as, polyamide 6 and polyamide 66) and acetal resins. (such as, POM copolymer).

Composite Polymer Particles

As used herein, the term composite polymer particles refers to particles made from the emulsion polymerization of (meth)acrylic monomers in the presence of a polyolefin dispersion.

In one embodiment, the composite polymer particles have a crosslinked structure.

In another embodiment, the composite polymer particles exhibit a core/shell structure.

In yet another embodiment, the composite polymer particles have a core with a partial shell structure.

In yet another embodiment, the polyolefin component of the composite polymer particle is functionalized after the formation of the polyolefin dispersion, including for example, during the emulsion polymerization process.

In an alternative embodiment, the composite polymer particles have a core/shell structure wherein the core comprises polyolefin.

In yet another alternative embodiment, the composite polymer particles have a core/shell structure wherein the (meth)acrylic monomers polymerize onto the polyolefin to form at least a partial shell around the polyolefin core.

In some embodiments, the composite polymer particles may contain from 50 to 95 wt % units derived from olefin and from 5 to 50 wt % units derived from (meth)acrylic. All individual values and subranges from 50 to 95 wt % are included herein and disclosed herein; for example, the units derived from olefin may be from an upper limit of 55, 60, 65, 70, 75, 80, 85, 90 or 95 wt % to a lower limit of 50, 55, 60, 65, 70, 75, 80, 85, or 90 wt %. For example, the units derived from olefin may range from 50 to 95 wt %, or in the alternative, the units derived from olefin may range from 60 to 95 wt %, or in the alternative, the units derived from olefin may range from 70 to 90 wt %, or in the alternative, the units derived from olefin may range from 85 to 95 wt %, or in the alternative, the units derived from olefin may range from 65 to 85 wt %. All individual values and subranges from 5 to 50 wt % are included herein and disclosed herein; for example, the units derived from (meth)acrylic may range from an upper limit of 10, 15, 20, 25, 30, 35, 40, 45 or 50 wt % to a lower limit of 5, 10, 15, 20, 25, 30, 35, 40, or 45 wt %. For example, the units derived from (meth)acrylic may range from 5 to 50 wt %, or in the alternative, the units derived from (meth)acrylic may range from 10 to 50 wt %, or in the alternative, the units derived from (meth)acrylic may range from 5 to 40 wt %, or in the alternative, the units derived from (meth)acrylic may range from 5 to 30 wt %, or in the alternative, the units derived from (meth)acrylic may range from 15 to 35 wt %.

In some embodiments of the composite particles, the meth(acrylic) phase is partially crosslinked.

In some embodiments of the composite particles, the (meth)acrylic phase has a Tg of at least 50° C. All individual values and subranges from at least 50° C. are included herein and disclosed herein. For example, the Tg of the (meth)acrylic phase may be from at least 50° C., or in the alternative, the Tg of the (meth)acrylic phase may be from at least 50° C., or in the alternative, the Tg of the (meth)acrylic phase may be from at least 60° C., or in the alternative, the Tg of the (meth)acrylic phase may be from at least 70° C., or in the alternative, the Tg of the (meth)acrylic phase may be from at least 80° C. to an upper limit of 125° C.

The composite polymer composition may used as an additive in matrix resins to improve one or more properties of the matrix resin. Such properties include, for example, impact strength, cold temperature properties, weatherability, color stability, high temperature properties and processability.

Furthermore, the composite polymer composition may be useful, with or without the use of a matrix resin. For example, the composite polymer composition may be used in can coatings, coatings, cellulose coatings, binders and non-woven textiles, textile coatings, inks and pigments, films, absorbents, ion exchange, carpet backing or adhesive, fiber adhesive, wiping products and foams.

EXAMPLES

The following examples illustrate the present invention but are not intended to limit the scope of the invention.

An aqueous polyolefin dispersion is prepared utilizing a KWP (Krupp Werner & Pfleiderer Corp. (Ramsey, N.J.) ZSK25 extruder (25 mm screw diameter, 60 L/D rotating at 450 rpm) according to the following procedure. The base polyolefin resin (an ethylene-octene copolymer), such as ENGAGE 8200 from The Dow Chemical Company (density=0.87 g/cm3, melt flow index=5 (190° C./2.16 kg), Glass transition temperature (Tg)=−53° C.) and maleated polyethylene (such as LICOCENE PE MA 4351 from Clariant International Ltd. (Muttenz, Switzerland) are supplied to the feed throat of the extruder via a Schenck Mechatron lossin-weight feeder and a Schenck volumetric feeder, respectively. The polymers are then melt blended, and then emulsified in the presence of initial aqueous stream and a lauryl ether (2EO) sulfate (Empicol ESB 70 from Huntsman Corporation) at high pressure. Additionally, a mixture of peroxide, such as LUPEROX 101, and/or maleic acid are added to this zone of the extruder, so that the peroxide would crosslink the particles, and/or crosslink the particles as well as graft the maleic anhydride to the surface of the particles. LUPEROX 101 is available from a variety of sources, such as Arkema, Inc. and Sigma-Aldrich Co., LLC.

The emulsion phase is then conveyed forward to the dilution and cooling zone of the extruder where additional dilution water is added to form the aqueous dispersions having solid level contents in the range of from less than 70 weight percent. The initial aqueous stream, and the dilution water are all supplied by Isco dual syringe pumps (from Teledyne Isco, Inc. (Lincoln, Nebr., USA). The barrel temperature of the extruder is set to 150° C. A solution of maleic acid (1.75%) and LUPEROX 101 (0.2%) peroxide is injected prior to the exit of the dispersion from the extruder, with the percentages based on the solids of the dispersion. After the dispersion exits the extruder, it is further cooled and filtered via a 200 μm mesh size bag filter. Particle size analysis can be done with the Beckman Coulter LS 13320 Laser Light Scattering Particle Sizer (Beckman Coulter Inc., Fullerton, Calif.) using the standard procedure to obtain volume average particle size.

TABLE 1

Summary of Polyolefin Dispersions

| | ENGAGE 8200 (part) | LICOCENE PE MA 4351 | Lauryl ether (2EO) sulfate | LUPEROX 101* | Maleic acid* |
|---|---|---|---|---|---|
| Dispersion 1 | 80 | 16 | 4 | 0.2 | 1.75 |
| Dispersion 2 | 88 | 10 | 2 | 0.15 | 1.5 |

*May be added downstream in the extruder after the formation of polyolefin particles Polyolefin/(meth)acrylic composite core/shell polymer is produced using emulsion polymerization using the aqueous polyolefin dispersion as a seed to produce an inventive core/shell polymer composition according to the following procedure.

All polymerizations are conducted by charging into a round bottom flask reactor the indicated amount as solids of the polyolefin dispersion in Table 1 and purging with nitrogen gas while maintaining at 65° C. Catalyst solution is added into the reactor while stirring. Reaction is carried on by premixing the indicated monomers (including functional monomers as well as crosslinking monomers) and preparing a monomer emulsion in the proportions indicated in Table 1 and inject the mixture into the reactor over 60 minutes. At the same time, a redox catalyst pair is fed into the reactor, as a free radical initiator over 90 min. The reaction is maintained at 60° C. for 90 min and then allowed to cool to 25° C. and filtered through a 190 μm filter. The resulting dispersion would be comprised of polyolefin particles containing PMMA based acrylic shell, with 15 wt % relative to the polyolefin.

TABLE 2

Seeded Emulsion Polymerization Composition

| | |
|---|---|
| Reactor Charge | Deionized water (DI water) 811.35 g |
| | Polyolefin dispersion 2 in Table 1 |
| | (50.8 wt. % solid) 2700 g |
| Catalyst (shot) | FeSO$_4$ 0.135 g |
| | Deionized water 5.4 g |
| Monomer Emulsion: | DI water: 49.5 g |
| | Dodecyl sodium sulfonate 1.88 g |
| | Ethylhexyl methacrylate (EHA) 12.33 g |
| | Methylmethacrylate (MMA) 190.35 g |
| | Methacrylic acid (MAA) 12.33 g |
| | 3-(Trimethoxysilyl)propyl methacrylate 1.03 g |
| | Ethylene glycol dimethacrylate (EGDMA) 2.06 g |
| Initiators (cofeed) | t-Butyl peroxide (70% active) 0.99 g dissolved |
| | in 27 g deionized water |
| | Sodium formaldehyde sulfoxylate 0.69 g |
| | dissolved in 27 g deionized water |

By changing the ratio of monomers to olefin, polyolefin particles with PMMA based acrylic shell (10-40 wt % relative to the polyolefin) can be obtained.

The inventive core/shell polymer composition is spray dried according to the following procedure. A two-fluid nozzle atomizer equipped on a Mobile Minor spray dryer (GEA Process Engineering Inc. (Copenhagen, Denmark)). The nitrogen pressure to nozzle is fixed at 1 bar with 50% flow which is equivalent to 6.0 kg/hour of air flow. A glass jar is placed under the cyclone with the valve on the bottom of the cyclone open. Olefin-acrylic dispersion (~40 wt % solid) is then pumped into the heated chamber by an emulsion feed pump. The spray drying experiment is conducted in N$_2$ environment with an inlet temperature fixed at 120° C., and the outlet temperature is controlled at 40° C. by tuning the feed rate of the dispersion. Meanwhile, the hydrophobic surface modified CaCO$_3$ (WINNOFIL® S, from Solvay Chemicals (Brussels, Belgium)) is fed into the chamber as an anti-caking agent. The mean particle size of the dry powder expected to be in the range of 20-40 μm.

The inventive composite polymer composition (olefin: acrylic=100:15, acrylic phase 90.5% MMA/MAA4%/EHA4%/1.5% ethylene glycol dimethacrylate and 0.5 wt % trimethylsilymethacrylate (TMOSMA) could be used as an impact modifier in polycarbonate (LEXAN 141, commercially obtained from SABIC Americas, Inc. (Houston, Tex.), melt index 12 g/min).

Compounding Procedure

The grafted polyolefin core-shell is used as impact modifier in polycarbonate (such as LEXAN 141R, available from Saudi Basic Industries Corporation (SABIC)) or polyamide 6 (such as ULTRAMID 8202, available from BASF). Before compounding, the resins are thoroughly dried 4 hours at 110° C. in a low pressure dryer.

The resin and the impact modifier at 5% addition level, is compounded with Werner and Pfleiderer ZSK 30 co-rotating twin screw extruder (L/D=26).

The resin and the modifiers are supplied to the feed throat of the extruder via the gravimetric K-Tron feeders and then melt blended. The extruded strand is then cooled and pelletized with a granulometer (Sheer & Cie-Stuttgart 30).

The temperature profile of the extruder is typically 260-270-280-285-290° C. (from the hopper to the die) and the compounding is done with a screw speed of 150 RPM and an output of 10 Kg/hr.

Test Methods

Test methods include the following:

Density of ethylene-based polymers are measured according to ISO 1183.

Density of propylene-based polymers are measured according to ASTM D792.

Melt flow index is measured according to ASTM D-1238.

The present invention may be embodied in other forms without departing from the spirit and the essential attributes thereof, and, accordingly, reference should be made to the appended claims, rather than to the foregoing specification, as indicating the scope of the invention.

I claim:

1. A process to produce a composite polymer composition comprising:
   (i) melt kneading one or more polyolefins, one or more dispersion stabilizing agents, water and optionally a neutralizing agent, to form an aqueous dispersion; wherein the melt kneading product of one or more polyolefins comprises polyolefin particles having a volume average particle size between 150 nm and 2000 nm;
   (ii) functionalizing the one or more polyolefins in the aqueous dispersion to form a functionalized polyolefin having a Tg equal to or less than 50° C. and comprising from 15 to 100 wt % maleic anhydride grafted polyolefins; and
   (iii) subjecting one or more (meth)acrylic monomers and the aqueous dispersion comprising the functionalized polyolefins to an emulsion polymerization process, wherein the one or more (meth)acrylic monomers are polymerized onto the functionalized polyolefin particles to form composite polymer particles during the emulsion polymerization process, wherein the one or more (meth)acrylic monomers are polymerized onto the functionalized polyolefin particles to form composite polymer particles during the emulsion polymerization process.

2. The process of claim 1 wherein the ratio by weight of the one or more polyolefins to the one or more (meth)acrylic monomers is between 60:40 and 95:5.

3. The process of claim 1 wherein the one or more polyolefins are crosslinked with peroxides.

4. The process of claim 1 wherein the functionalized polyolefin is prepared by one or more processes selected from the group consisting of thermal grafting, photo initiation and redox radical generation.

* * * * *